United States Patent [19]

Reber et al.

[11] Patent Number: 6,081,827

[45] Date of Patent: Jun. 27, 2000

[54] NETWORK NAVIGATION METHODS AND SYSTEMS USING AN ARTICLE OF MAIL

[75] Inventors: William L. Reber, Schaumburg, Ill.; Cary D. Perttunen, Shelby Township, Mich.

[73] Assignee: Motorola, Inc., Schaumburg, Ill.

[21] Appl. No.: 08/876,935

[22] Filed: Jun. 16, 1997

Related U.S. Application Data

[63] Continuation-in-part of application No. 08/710,820, Sep. 23, 1996, application No. 08/726,004, Oct. 4, 1996, application No. 08/732,956, Oct. 17, 1996, application No. 08/744,338, Nov. 7, 1996, abandoned, and application No. 08/858,184, May 28, 1997.

[51] Int. Cl.$^7$ ................................................. G06F 15/16
[52] U.S. Cl. ........................... 709/200; 709/217; 709/206
[58] Field of Search ................. 395/200.75, 200.34, 395/200.47, 200.57, 200.59, 200, 206

[56] References Cited

U.S. PATENT DOCUMENTS

| | | | |
|---|---|---|---|
| 3,818,190 | 6/1974 | Silverman et al. | 235/61.7 |
| 3,999,042 | 12/1976 | Silverman et al. | 235/61.7 |
| 4,044,227 | 8/1977 | Holm et al. | 209/111.5 |
| 4,841,132 | 6/1989 | Kijitani et al. | 235/375 |
| 4,937,853 | 6/1990 | Brule et al. | 379/96 |
| 5,115,326 | 5/1992 | Burgess et al. | 358/440 |
| 5,156,898 | 10/1992 | McDonald | 428/100 |
| 5,280,625 | 1/1994 | Howarter et al. | 395/200 |
| 5,308,685 | 5/1994 | Froggett | 428/204 |
| 5,319,562 | 6/1994 | Whitehouse | 364/464.03 |
| 5,510,992 | 4/1996 | Kara | 364/464.02 |
| 5,539,870 | 7/1996 | Conrad et al. | 395/155 |
| 5,541,394 | 7/1996 | Kouchi et al. | 235/375 |
| 5,548,722 | 8/1996 | Jalalian et al. | 395/200.1 |
| 5,583,940 | 12/1996 | Vidrascu et al. | 380/49 |
| 5,590,197 | 12/1996 | Chen et al. | 380/24 |
| 5,602,918 | 2/1997 | Chen et al. | 380/21 |
| 5,606,507 | 2/1997 | Kara | 364/464.18 |
| 5,613,012 | 3/1997 | Hoffman et al. | 382/115 |
| 5,625,781 | 4/1997 | Cline et al. | 395/335 |
| 5,630,079 | 5/1997 | McLaughlin | 395/335 |
| 5,638,504 | 6/1997 | Scott et al. | 395/7.61 |
| 5,640,002 | 6/1997 | Ruppert et al. | 235/472 |
| 5,640,193 | 6/1997 | Wellner | 348/7 |
| 5,640,565 | 6/1997 | Dickinson | 395/683 |
| 5,659,164 | 8/1997 | Schmid et al. | 235/375 |
| 5,668,990 | 9/1997 | Bajorinas et al. | 395/615 |
| 5,675,733 | 10/1997 | Williams | 395/200.36 |
| 5,677,955 | 10/1997 | Doggett et al. | 380/24 |
| 5,689,642 | 11/1997 | Harkins et al. | 395/200.04 |
| 5,694,471 | 12/1997 | Chen et al. | 380/25 |
| 5,694,546 | 12/1997 | Reisman | 395/200.2 |
| 5,717,860 | 2/1998 | Graber et al. | 395/200.12 |
| 5,745,389 | 4/1998 | Russell | 364/580 |
| 5,758,216 | 5/1998 | Arnold | 396/311 |
| 5,793,972 | 8/1998 | Shane | 395/200.49 |
| 5,866,888 | 2/1999 | Bravman et al. | 235/375 |

FOREIGN PATENT DOCUMENTS

WO 97/01137  1/1997  WIPO .
WO 98/20411  5/1998  WIPO .

OTHER PUBLICATIONS

"Receive Electronic Shipment Information via Your PC," http://www.shiprps.com/service/access.htm, 1998.

"Postal Automation," http://www.tccmail.com/postal.html, No Date.

"Bar Code Pro Software," http://www.ciag.com/bcp.htm, No Date.

AC & E Barcode Information http://www.intrepid.net/nscanlite/pagetwo.html, Apr. 12, 1996.

Marvel Comics, Tiger Barcodzz Electronic LCD Game, "X–Men", Tiger Electronics, Inc., Marvel Entertainment Group, Inc. 1994.

(List continued on next page.)

Primary Examiner—Mehmet B. Geckil
Attorney, Agent, or Firm—Jeffrey G. Toler; James E. Gauger

[57] ABSTRACT

A network navigation method includes steps of reading machine-readable data (14) associated with an article of mail (12), and determining an electronic address (20) based upon the machine-readable data (14). A network navigation system is provided to perform the aforementioned steps.

17 Claims, 5 Drawing Sheets

OTHER PUBLICATIONS

Zuckerman, "It's a New Brand of E–Mail, Companies Want to Turn Computers Into Postage Meters", *The New York Times*, Monday, Apr. 28, 1997.

O'Malley, "Web TV", 10 PS 96, pp. 49–53.

Randall, "Discover the World Wide Web with Your Sportster", Samns.net.Publishing, 1996, (pp. 1–8).

"Advertising", *Community ConneXion, Inc.*, http://www.anonymizer.com/advert.html, 1995–1996, (p. 1).

"The Anonymizer FAQ", *Community ConneXion, Inc.*, http://www.anonymizer.com/faq.html, 1995–1996, (pp. 1–5).

"It's a New Brand of E–Mail", Article from The New York Times, Monday, Apr. 28, 1997.

"UPS OnLine™ Solutions" Advertisement.

*FIG.7*

NETWORK NAVIGATION METHODS AND SYSTEMS USING AN ARTICLE OF MAIL

RELATED APPLICATIONS

The present application is a continuation-in-part of the following applications which are assigned to the same assignee as the present application:

"Electronic Network Navigation Device and Method for Linking to an Electronic Address Therewith", having Ser. No. 08/710,820, filed Sep. 23, 1996;

"Methods and Systems for Providing a Resource in an Electronic Network", having Ser. No. 08/726,004, filed Oct. 4, 1996;

"An Apparatus for Reading an Electronic Network Navigation Device and a Peripheral for Use Therewith", having Ser. No. 08/732,956, filed Oct. 17, 1996;

"Method, System, and Article of Manufacture for Producing a Network Navigation Device", having Ser. No. 08/744,338, filed Nov. 7, 1996 now abandoned; and "Transaction Methods, Systems, and Devices", having Ser. No. 08/858,184, Inventors: William L. Reber et al., filed May 28, 1997.

The subject matter of the above-identified related applications is hereby incorporated by reference into the disclosure of this application.

FIELD OF THE INVENTION

The present invention relates to methods and systems for navigating an electronic network.

BACKGROUND OF THE INVENTION

The introductory chapter of *Discover the World Wide Web with Your Sportster,* Second Edition, provides a perceptive commentary on the present state of the Internet and the World Wide Web. Here, it is stated that the Internet is in need of an application which will transform the "much-hyped but difficult-to-use linking of computers around the world to being a highly informative, highly usable database and communications tool." It is further stated that the various available Web browsers (e.g. Mosaic and Netscape Navigator) all have difficulties and limitations which make them insufficient to handle the complexity of the Internet.

Part of the problem is in the complexity of addressing a resource on the World Wide Web. The World Wide Web uses an addressing system known as a URL (Uniform Resource Locator) that defines the location of a resource on the Internet. URLs are comprised of up to four parts: a protocol, a domain name, a path, and a filename. The combination of these four parts can produce a complex address for a resource. For example, the address for information on two-way pagers on the Motorola home page is: http://www.mot.com/MIMS/MSPG/Products/Two-way/tango/desc.html.

Another part of the problem is in the rapid increase of the number of entities and the number of resources on the World Wide Web. Many entities are finding that domain names which they desire are already reserved. As a result, some entities have to purchase their desired domain name from another holder, or have to reserve a less than desirable domain name. Further, as the number of resources increases, newly-formed URLs become less intuitive and greater in length.

SUMMARY OF THE INVENTION

The present invention provides a method which comprises receiving an article of mail physically delivered from a sender to a recipient by a delivery service. The article of mail has a bar code which uniquely identifies the article of mail to the delivery service. The method further comprises reading the bar code after the recipient receives the article of mail. The bar code is read by the recipient using a bar code reader. An electronic address of the sender of the article of mail is determined based upon at least a portion of the bar code read by the recipient using the bar code reader, and a message is communicated to the electronic address of the sender.

The present invention further provides a system comprising a translation device, a terminal, a bar code reader, and a digital computing device. The terminal is for preparing an article of mail for delivery by a delivery service from a sender to a recipient. The article of mail is prepared to include a bar code which uniquely identifies the article of mail to the delivery service. The terminal is further for communicating bar code data encoded by the bar code and an electronic address of the sender to the translation device. The bar code reader is usable by the recipient to read the bar code from the article of mail after the delivery service has physically transported the article of mail to the recipient. The digital computing device cooperates with the bar code reader and the translation device to retrieve the electronic address based upon at least a portion of the bar code read from the article of mail using the bar code reader. The digital computing device further communicates a message to the electronic address of the sender.

The present invention still further provides a database comprising a computer-readable medium which stores first bar code data, a first electronic address associated with the first bar code data, second bar code data, and a second electronic address associated with the second bar code data. The first bar code data uniquely identifies a first article of mail physically delivered from a first sender to a recipient at a destination address. The first electronic address is associated with the first sender. The second bar code data uniquely identifies a second article of mail physically delivered from a second sender to the recipient at the destination address. The second electronic address is associated with the second sender.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

Embodiments of the present invention advantageously provide methods and systems for automatically navigating an electronic network to a destination associated with an article of mail. An end user can navigate to the destination using the article of mail without necessarily knowing the electronic address for the destination. As a result, the electronic address and the format for the electronic address become more transparent to the end user.

Figure 1:
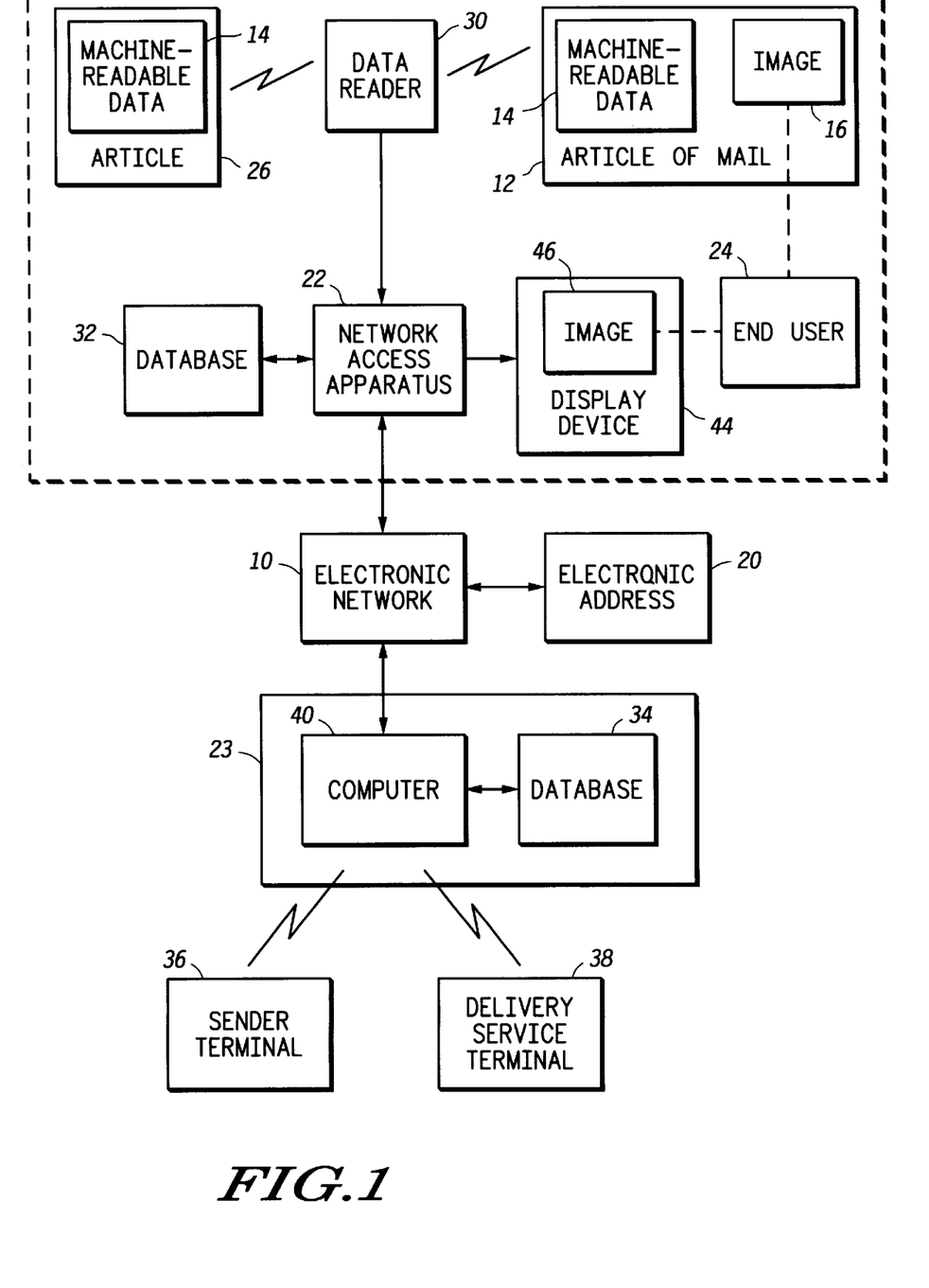
FIG. 1 is a block diagram of an embodiment of a system for navigating an electronic network using an article of mail.

FIG. 1 is a block diagram of an embodiment of a system for navigating an electronic network 10 using an article of mail 12. Preferably, the electronic network 10 includes an open, wide area network such as the Internet, the World Wide Web, or an online service. Other examples of the electronic network 10 include but are not limited to: an intranet, an extranet, a local area network, a telephone network such as a public switched telephone network, a cellular telephone network, a personal communication system (PCS) network, a television network such as a cable television system, a paging network such as a local paging network, a regional paging network, a national paging network, or a global paging network, and a wireless data network such as a satellite data network or a local wireless data network.

Examples of the article of mail 12 include, but are not limited to post cards, letters, items within envelopes, publications, packages, and parcels. The article of mail 12 can be physically delivered by a postal service such as the United States Postal Service (USPS), by a parcel service or courier service such as Federal Express and United Parcel Service, or by another delivery service.

Associated with the article of mail 12 are machine-readable data 14, and optionally, a human-readable image 16. The machine-readable data 14 is used to navigate to a destination of the electronic network 10 such as an electronic address 20. The optional human-readable image 16 is associated with either the electronic address 20 or a means for navigating to the electronic address 20.

Preferably, the electronic address 20 identifies the destination using at least a portion of a URL (Uniform Resource Locator), a URN (Uniform Resource Name), an IP (Internet Protocol) address, or an electronic mail address. It is noted that a URL can include up to four parts: a protocol, a domain name, a path, and a filename. URL protocols include: "file:" for accessing a file stored on a local storage medium; "ftp:" for accessing a file from an FTP (file transfer protocol) server; "http:" for accessing an HTML (hypertext marking language) document; "gopher:" for accessing a Gopher server; "mailto:" for sending an e-mail message; "news:" for linking to a Usenet newsgroup; "telnet": for opening a telnet session; and "wais:" for accessing a WAIS server. Consequently, the article of mail 12 can be utilized for automatically initiating any of the above tasks.

Preferably, the machine-readable data 14 includes data associated with the delivery of the article of mail 12. In this case, the data can assist in the delivery of the article of mail 12, or can identify the article of mail 12, for example.

In an exemplary embodiment, the machine-readable data 14 includes information-based indicia such as the information-based indicia proposed by the United States Postal Service. In this case, the machine-readable data 14 includes a destination address, a return address, a registration number, a transaction identifier, and a postage license associated with the article of mail 12. The aforementioned information is encoded using a printed code that includes a two-dimensional bar code.

U.S. Pat. Nos. 5,510,992 and 5,606,507 to Kara, which are hereby incorporated by reference into the disclosure of this application, disclose methods and systems for producing information-based indicia for the article of mail 12. Additionally, a commercially-available product from E-Stamp Corporation uses a desktop computer and a printer to print information-based indicia directly onto envelopes or labels for the article of mail 12.

As an alternative to the aforementioned information-based indicia, the machine-readable data 14 can include a ZIP+4 Postnet Bar Code or a Delivery Point Bar Code (DPBC) associated with the article of mail 12. The ZIP+4 Bar Code or the Delivery Point Bar Code may be associated with either a destination address or a return address for the article of mail 12.

As another alternative to information-based indicia, the machine-readable data 14 can include a one-dimensional or a two-dimensional bar code that identifies the article of mail 12. Examples of such bar codes include tracking codes used by United Parcel Service and Federal Express for delivering the article of mail 12.

As an alternative to or in addition to delivery-based data, the machine-readable data 14 can include navigation data for navigating the electronic network 10. In this case, the machine-readable data 14 can include any combination of: an instruction for selecting a client routine (e.g. an Internet or intranet browser routine) to be executed by a network access apparatus 22, an instruction for directing a connection from the network access apparatus 22 to a service provider (e.g. an Internet service provider) to access the electronic network 10, and a navigation instruction for linking to a resource of the electronic network 10. The navigation instruction can include either the electronic address 20 or an electronic address of a node 23 for determining the electronic address 20. Examples of these instructions are given in the above-listed patent applications incorporated by reference into this disclosure.

As another alternative to or in addition to delivery-based data, the machine-readable data 14 can include data to facilitate a transaction. Examples of data to facilitate a transaction include, but are not limited to, data indicating an item in a transaction and data indicating a party of a transaction. Examples of these and other transaction data are described in the patent application entitled "Transaction Methods, Systems, and Devices" which is incorporated by reference into this disclosure.

Regardless of the data encoded thereby, the machine-readable data 14 preferably includes a printed code such as a one-dimensional or a two-dimensional bar code. Examples of one-dimensional bar codes include, but are not limited to, 3 of 9, UPC-A, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, Data Matrix and PDF417.

Typically, the printed form of the machine-readable data 14 is not readily interpretable or not readily discernible by an end user 24. For example, although a human may be specially trained to mentally decode a bar code, such a code is practically indiscernible by most humans. Further, the machine-readable data 14 can be printed to be either visible or invisible to the end user 24.

As alternatives to printed data, the machine-readable data 14 can include magnetic data, electronic data, or optical data. If desired, the machine-readable data 14 can be selected to be readable by more than one type of data reader. For example, printed data can be printed with a magnetic substance, such as magnetic ink, so as to be readable by both an optical reader and a magnetic reader.

The optional human-readable image 16 can be indicative of one or more of: (i) a resource in the electronic network 10 associated with the article of mail 12; (ii) a service which determines the electronic address 20 based upon the machine-readable data 14; (iii) a client routine initiated by the machine-readable data 14; (iv) a service provider selected by the machine-readable data 14; and (v) an advertiser. Generally, the human-readable image 16 can include textual information and/or graphical information.

The machine-readable data 14 and the human-readable image 16 can be associated with the article of mail 12 in a variety of ways. One way is to have the machine-readable data 14 and the human-readable image 16 supported by the article of mail 12. In this case, the machine-readable data 14 and the human-readable image 16 can be either: (i) printed directly onto packaging for the article of mail 12 such as an envelope, a box, a diskette shipper, or a tube; (ii) printed onto a substrate such as a mailing label for affixing or adhering to the packaging for the article of mail 12; or (iii) printed to contents of the article of mail 12, such as a letter or other correspondence, which may or may not be externally viewable through the packaging. Another way is to have the machine-readable data 14 and the human-readable image 16 supported by an article 26 detached or detachable from the article of mail 12. In this case, the article 26 can include an address card, a routing slip, a shipping form, a direct mail card, or a like article associated with the article of mail 12.

A data reader 30 is used to read the machine-readable data 14 from the article of mail 12. The form of the data reader 30 is dependent upon the form of the machine-readable data 14. For printed data, the data reader 30 can include an optical data reader such as a bar code reader, a scanning wand, a handheld scanner, a page scanner, a business card reader, a photograph reader, a fax machine, or generally, a linear CCD (charge coupled device) reader or a two-dimensional CCD reader. For magnetically-stored data, the data reader 30 can include a magnetic read head. For electronically-stored data, the data reader 30 can include an electronic interface or a receiver.

The data reader 30 communicates a signal representative of the machine-readable data 14 to the network access apparatus 22. In response to receiving the machine-readable data 14, the network access apparatus 22 can execute any combination of: a predetermined client routine (e.g. a predetermined Internet browser routine), a predetermined network provider access routine (e.g. to dial and log on to a predetermined service provider), and navigation instructions for automatically linking the network access apparatus 22 either to the electronic address 20 or to the node 23 via the electronic network 10. Additionally, the network access apparatus 22 can initiate a transaction if the machine-readable data 14 include transaction data.

It is noted that the network access apparatus 22 can have a variety of forms, including but not limited to, a general purpose computer, a network computer, a network television, an Internet television, an Internet telephone, a portable wireless device, a television receiver, a game player, a video recorder, and an audio component. Regardless of its form, the network access apparatus 22 typically includes a processor in communication with at least one input device, a memory, and at least one storage device. The processor can include a microprocessor, an application-specific integrated circuit, or another suitable integrated circuit. The memory can include a read-only memory and/or a random access memory in communication with the processor. The at least one input device can include a keyboard and/or a pointing device for receiving user-initiated events from the end user 24. The at least one storage device can include a floppy disk drive, a PC card storage device, an optical drive, a DVD drive, a CD-ROM drive, or a hard drive to store computer-readable data.

To communicate with the electronic network 10, the network access apparatus 22 includes a modem, a network adapter, a wireless transceiver, a wireline transceiver, or another transceiver. The network access apparatus 22 can communicate with the electronic network 10 via a line such as a telephone line, an ISDN line, a coaxial line, a cable television line, a fiber optic line, a computer network line, or the like. Alternatively, the network access apparatus 22 can wirelessly communicate with the electronic network 10.

If the machine-readable data 14 encodes the electronic address 20, the network access apparatus 22 decodes the machine-readable data 14 to determine the electronic address 20. In this case, for example, the network access apparatus 22 can decode the machine-readable data 14 in accordance with a bar code standard.

If the machine-readable data 14 does not directly encode the electronic address 20, the electronic address 20 is determined using a database. The database can be local to the network access apparatus 22, such as a database 32, or can be accessible via the electronic network 10, such as a database 34 at the node 23. In these cases, the database 32 and/or the database 34 each includes a plurality of records associating data with electronic addresses. The database 32 and/or the database 34 determines the electronic address 20 by matching the machine-readable data 14 with one of the records.

Each database includes a storage device to store its data in a computer-readable form with a computer-readable storage medium. Examples of the computer-readable storage medium include, but are not limited to, an optical storage medium such as a compact disk read-only memory (CD-ROM) or a digital versatile disk (DVD), a magnetic storage medium such as a hard disk or a floppy disk, and an electronic storage medium such as a memory.

Preferably, the records in the database 34 are populated by either a sender terminal 36 or a delivery service terminal 38. Each of the sender terminal 36 and the delivery service terminal 38 can include a computer running the aforementioned product from E-Stamp Corporation, systems in accordance with U.S. Pat. Nos. 5,510,992 and 5,606,507 to Kara, or a computer running software from UPS including UPS OnLine™ Office, UPS OnLine™ Professional and other UPS OnLine™ Solutions software. In these cases, delivery-based data printed to the article of mail 12 is communicated to a computer 40 associated with the database 34. Additionally, an electronic address associated with the delivery-based data is communicated to the computer 40.

The delivery-based data and the electronic address can be communicated to the computer 40 specifically for the article of mail 12. In this case, the delivery-based data and the electronic address can be communicated to the computer 40 upon printing the delivery-based data to the article of mail 12. Alternatively, the delivery-based data and the electronic address can be applicable for a plurality of articles of mail either sent by the sender or delivered by the delivery service. In this case, the electronic address can be communicated to the database 34 when registering to use information-based indicia.

The network access apparatus 22 communicates at least a portion of the machine-readable data 14 either locally to the database 32 or remotely to the database 34 via the electronic network 10. Optionally, the machine-readable data 14 includes an electronic address for linking to the node 23 to access the database 34. The database 32 or the database 34 receives the data, matches the data to a record, and returns the electronic address 20. Data representative of the electronic address 20 is communicated to the network access apparatus 22 via either a local connection or the electronic network 10.

Typically, the node 23 and the electronic address 20 have different URLs. For example, the node 23 can have a different domain name than the electronic address 20. Further, the node 23 and a node which provides the electronic address 20 can be geographically distant from each other (e.g. can be in different cities, different states or provinces, or different countries).

After determining the electronic address 20 from the machine-readable data 14, the network access apparatus 22 can perform any combination of: linking to the electronic address 20, communicating a message to the electronic address 20, and receiving data from the electronic address 20. By linking to the electronic address 20, the end user 24 can link to a Web page or an online document associated with either the content of the article of mail 12, the sender of the article of mail 12, the deliverer of the article of mail 12, or an advertiser associated with the article of mail 12, for example. By communicating a message to the electronic address 20, the end user 24 can acknowledge receipt of the article of mail 12 to either the sender or the deliverer of the article of mail 12, for example, or can electronically reply to the article of mail 12. By receiving data from the electronic address 20, the end user 24 can receive either an electronic form of information printed in the article of mail 12, information that supplements or augments the information in the article of mail 12, or delivery information, for example.

The steps of linking, communicating a message, and/or receiving data can be performed to facilitate a transaction. For example, the end user 24 can purchase an item, pay a bill, pay taxes, vote in an election, renew a driver's license, renew an automobile registration, make ticket reservations, or purchase a sample of a video or a movie, upon receiving the article of mail 12.

A display device 44, such as a monitor, a television, or a liquid crystal display, is either coupled to or included with the network access apparatus 22 to display visual information received from the electronic address 20. To reinforce the intuitive association between the article of mail 12 and either the electronic address 20 or the node 23, the visual information includes an image 46 similar to (or can be equivalent to) at least a portion of the human-readable image 16.

It is noted that the node 23 can perform any of the functions of the nodes described in the patent application entitled "Methods and Systems for Providing a Resource in an Electronic Network" incorporated by reference into this disclosure. Examples of these functions include, but are not limited to, monitoring a usage parameter for electronic network navigation with the article of mail 12, limiting electronic network navigation when the usage parameter attains a usage limit, and providing a proxy server for resources of the electronic network 10. Additionally, the node 23 can specify a level of service with which to provide a resource to the end user 24.

Further, the node 23 can store a time and a date at which the end user 24 reads the machine-readable data 14. The node 23 can store the time and the date in the database 34. This is beneficial in documenting when the end user 24 receives the article of mail 12, for example.

Figure 2:
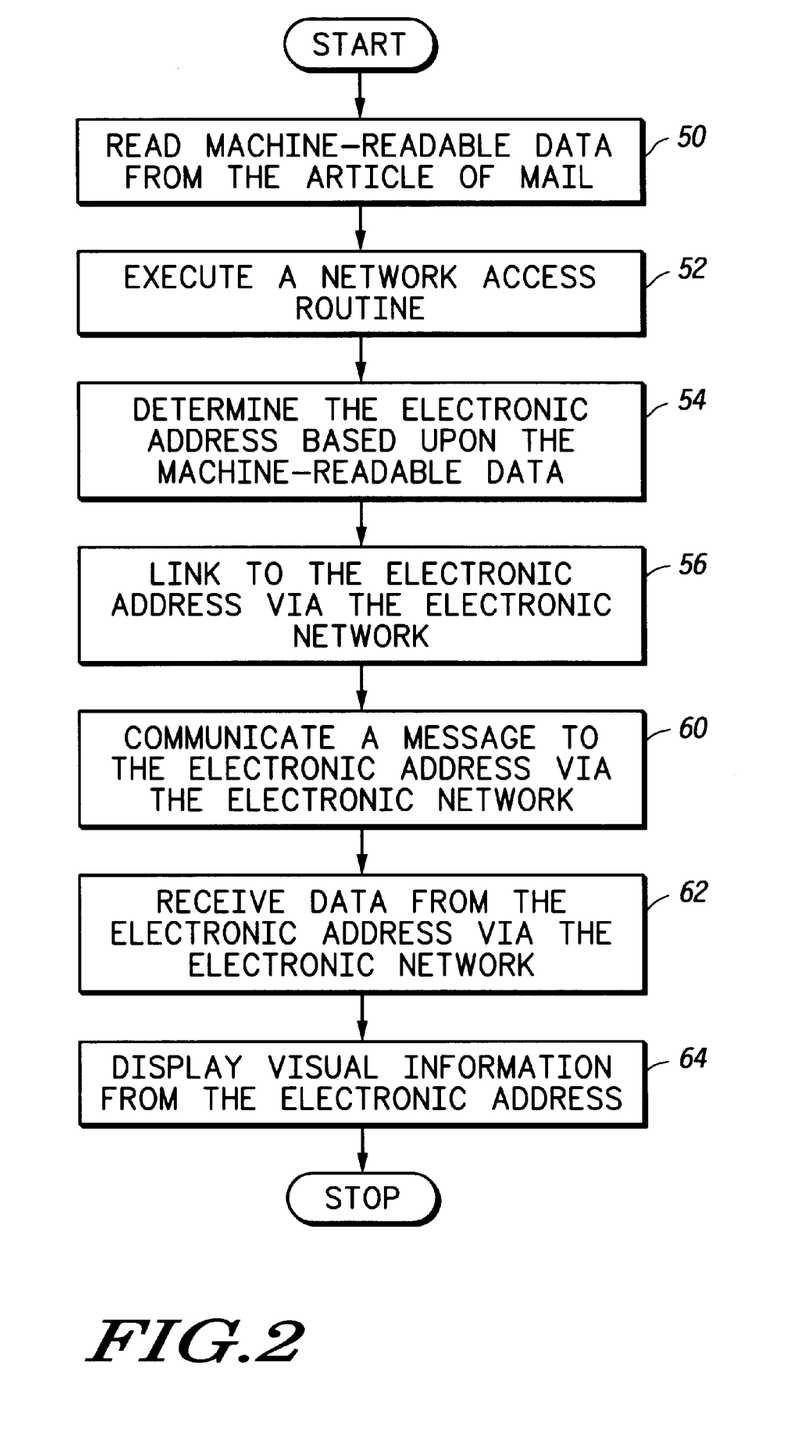
FIG. 2 is a flow chart of an embodiment of a network navigation method using the article of mail.

FIG. 2 is a flow chart of an embodiment of a network navigation method using the article of mail 12. As indicated by block 50, the method includes a step of reading the machine-readable data 14 from the article of mail 12. The machine-readable data 14 is read using the data reader 30. Preferably, the step of reading the machine-readable data 14 includes reading a printed code associated with the article of mail 12. It is also preferred that the step of reading the machine-readable data 14 includes reading data associated with a sender of the article of mail 12.

In an exemplary embodiment, the step of reading the machine-readable data 14 includes reading at least a portion of an information-based indicia associated with the article of mail 12. In this case and other cases, the step of reading the machine-readable data 14 can include reading at least one of data associated with a return address for the article of mail 12, data associated with a destination address for the article of mail 12, data associated with a registration number for the article of mail 12, data associated with a transaction identifier for the article of mail 12, and data associated with a postage license number for the article of mail 12.

Alternatively, the step of reading the machine-readable data 14 can include reading a ZIP+4 Postnet Bar code or a Delivery Point Bar Code associated with either a destination address or a return address for the article of mail 12. As another alternative, the step of reading the machine-readable data 14 can include reading a tracking code for the article of mail 12.

As indicated by block 52, a step of executing a network access routine is performed. The network access routine is executed by the network access apparatus 22. If desired, the network access routine can be automatically initiated upon reading the machine-readable data in block 50, or upon receiving another user-initiated action. Alternatively, the step of executing the network access routine can be executed prior to reading the machine-readable data 14 in block 50.

The step of executing the network access routine can include any of: (i) executing a routine to connect and/or to log on to a service provider (e.g. executing a dial-up routine or a wireless authentication routine to connect to a service provider); and (ii) executing a client routine for subsequent user interaction via the electronic network 10 (e.g. executing a graphical user interface routine or a Web browsing routine).

Optionally, the machine-readable data 14 includes instructions for directing the initiation of the network access routine, and for directing which network access routine is to be executed. In this case, the network access apparatus 22 can perform these instructions upon reading the machine-readable data 14 in block 50.

As indicated by block 54, a step of determining the electronic address 20 based upon the machine-readable data 14 is performed. The step of determining the electronic address 20 can include determining at least a portion of, and optionally, an entire portion of a URL, a URN, an IP address, or an electronic mail address, for example, associated with the article of mail 12.

If the machine-readable data 14 encodes at least a portion of the electronic address 20, a step of decoding the machine-readable data 14 is performed to determine the electronic address 20. For example, the machine-readable data 14 can be decoded in accordance with a predetermined bar code standard to determine the electronic address 20. If the machine-readable data 14 encodes a portion of a URL, a portion of a URN, a portion of an IP address, or a portion of an e-mail address, an additional step of completing the electronic address can be performed. For example, if an IP address is received, the IP address can be prepended by "http://".

Alternatively, the step of determining the electronic address 20 includes retrieving the electronic address 20 from a database based upon at least a portion of the machine-readable data 14. In this case, the electronic address 20 can be determined by a look-up operation using either the database 32 or the database 34. For embodiments wherein the article of mail 12 has an information-based indicia, the electronic address 20 can be determined based upon at least one of the return address, the destination address, the registration number, the transaction identifier, and the postage license. Of particular interest are cases in which the electronic address includes an electronic mail address, a uniform resource locator, a uniform resource name, or an internet protocol address associated with the sender of the article of mail 12.

Optionally, as indicated by block 56, the method includes a step of linking to the electronic address 20 via the electronic network 10. This step can include transmitting data representative of the electronic address 20 to the electronic network 10 to establish a link to the electronic address 20.

As indicated by block 60, the method optionally includes a step of communicating a message to the electronic address 20 via the electronic network 10. The message can be included in an electronic mail message to the electronic address 20, or in data communicated upon linking to the electronic address 20 in block 56. The message can reply to or acknowledge receipt of the article of mail 12, for example.

As indicated by block 62, the method optionally includes a step of receiving data from the electronic address 20 via the electronic network 10. The data can encode audible information and/or visual information, such as graphical information and/or textual information, from the electronic address 20. Examples of data content include, but are not limited to, any combination of a file from a local hard drive, a file from a FTP server, an HTML document, content from a Gopher server, a message from a newsgroup, a transmission from a Telnet session, a transmission from a WAIS server, an animation file, a movie file, an audio file, downloadable software, and an electronic book file.

The data can also have the form of an Internet telephone call with an individual. The individual can include the sender of the article of mail 12, the recipient of the article of mail 12, or a deliverer of the article of mail 12. In these cases, the human-readable image 16 can include a picture and/or a name of the individual, and the machine-readable data 14 can include a telecommunication number or an electronic address for communicating with the individual.

As indicated by block 64, the method includes a step of displaying visual information from the electronic address 20. The visual information can be displayed by the display device 44 or a hard copy device such as a printer. As described earlier, the visual information can include an image which corresponds to at least a portion of the human-readable image 16 of the article of mail 12.

An article of manufacture can be formed to direct the network access apparatus 22 to perform the above-described steps. The article of manufacture can include a computer-readable storage medium having computer-readable data stored therein which directs the network access apparatus 22 to perform the above-described steps. Examples of the computer-readable storage medium include, but are not limited to, a logic circuit, a memory, a mass storage medium, an optical disk, a CD-ROM, a magnetic disk, a floppy disk, a hard disk, and a PCMCIA card.

Figure 3:
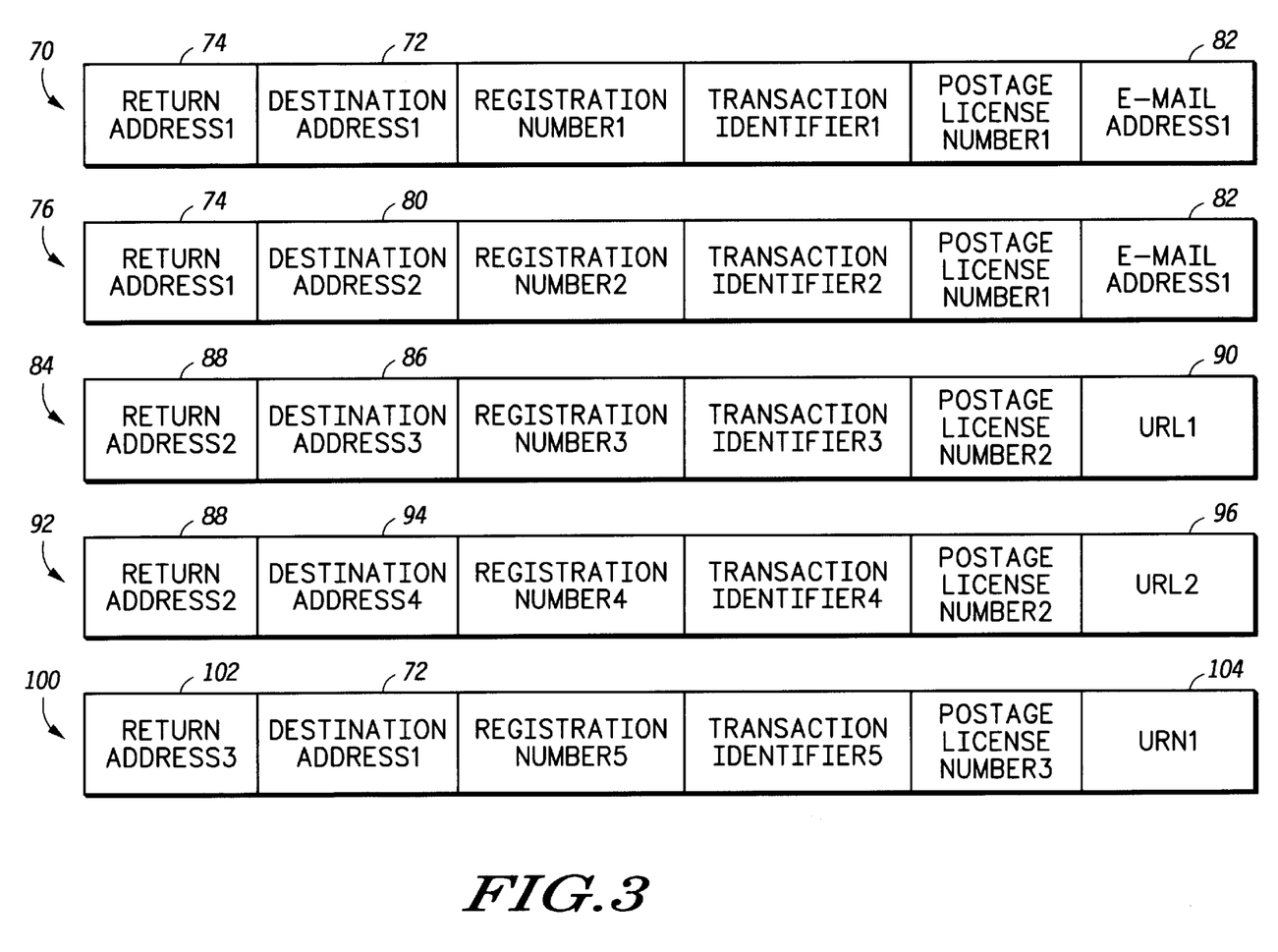
FIG. 3 is a block diagram of records in a database for determining the electronic address.

FIG. 3 is a block diagram of records in a database, such as databases 32 or 34, for determining the electronic address 20. Each of the records includes an electronic address corresponding to delivery-based data for an article of mail. For purposes of illustration and example, each electronic address is associated with a corresponding USPS information-based indicia. It is noted, however, that the database can alternatively associate the electronic addresses with other data.

A first record 70 corresponds to a first article of mail sent to a first destination address 72 by a sender having a first return address 74. A second record 76 corresponds to a second article of mail sent to a second destination address 80 by the sender having the first return address 74. Associated with both the first article of mail and the second article of mail is an e-mail address 82. Consequently, recipients of the first article of mail and the second article of mail can communicate with the sender using the same e-mail address 82.

A third record 84 corresponds to a third article of mail sent to a third destination address 86 by a sender having a second return address 88. Associated with the third article of mail is a first URL 90. A fourth record 92 corresponds to a fourth article of mail sent to a fourth destination address 94 by a sender having the second return address 88. Associated with the fourth article of mail is a second URL 96 that can differ from the first URL 90. In these cases, the recipient of the third article of mail and the recipient of the fourth article of mail communicate to the sender using different electronic addresses.

A fifth record 100 corresponds to a fifth article of mail sent to the first destination address 72 by a sender having a third return address 102. Associated with the fifth article of mail is a URN 104. In this case, the recipient of the fifth article of mail can download an online document at the URN 104.

It should be appreciated that the database can generally include any plurality of records, and should not be construed to be limited to having five records as illustrated.

Figure 4:
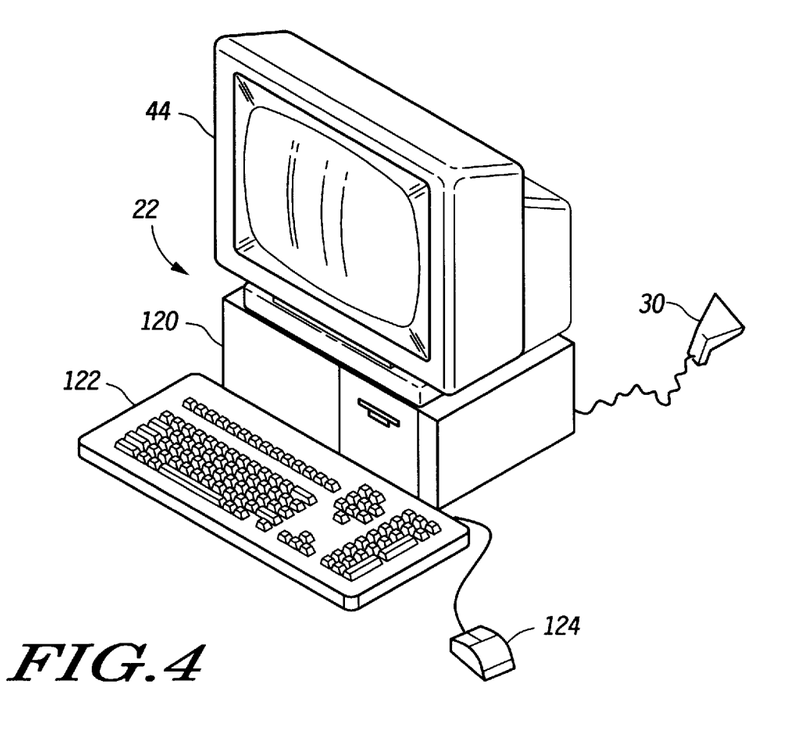
FIG. 4 is an illustration of an example of the data reader and the network access apparatus at the user location.

FIG. 4 is an illustration of an example of the data reader 30 and the network access apparatus 22 at the user location. In this example, the network access apparatus 22 comprises a personal computer 120, and at least one input device including a keyboard 122 and a mouse 124. The display device 44 comprises a monitor connected to a video port of the personal computer 120. The data reader 30 includes a two-dimensional bar code reader connected to a serial port of the personal computer 120. The personal computer 120 includes a modem, a network adapter, or another transceiver for communicating with the electronic network 10.

Figure 5:
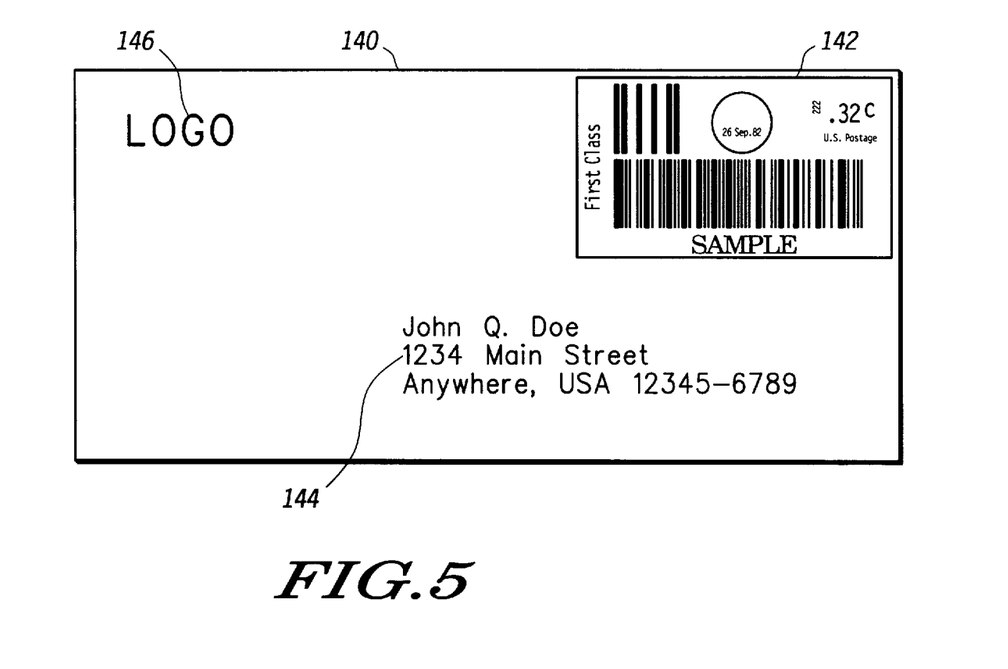
FIG. 5 is an illustration of a first example of the article of mail.

FIG. 5 is an illustration of a first example of the article of mail 12. The article of mail 12 includes an envelope 140 containing a letter or other correspondence. The envelope 140 supports an information-based indicia 142. The information-based indicia 142 encodes a destination address, a return address, a registration number, a transaction ID, a postage license number, and an amount of postage remaining in an account. The end user 24 navigates to the electronic address 20 by reading the information-based indicia 142 using the data reader 30. The electronic address 20 can link to a Web page or an electronic mail address associated with the sender of the article of mail 12, for example.

The envelope 140 further supports the destination address in a human-readable form 144, and a logo 146 for the human-readable image 16. The image 46 displayed by the display device 44 corresponds to the logo 146.

Figure 6:
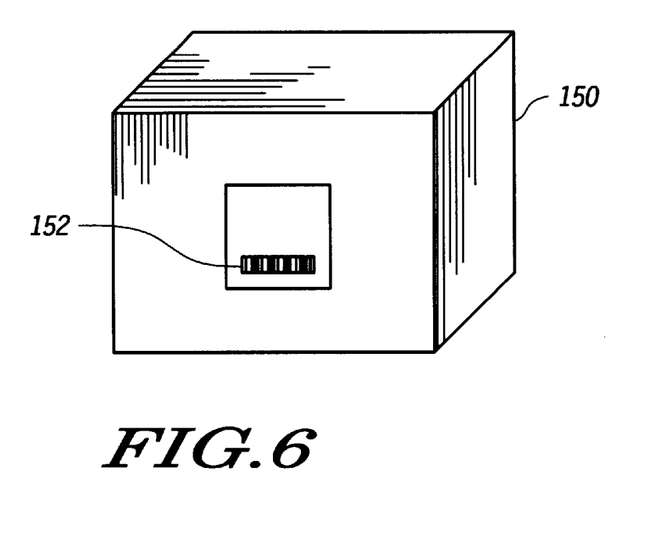
FIG. 6 is an illustration of a second example of the article of mail.

FIG. 6 is an illustration of a second example of the article of mail 12. The article of mail 12 includes a package 150. The package 150 supports a tracking code 152 used by a delivery service. The end user 24 navigates to the electronic address 20 by reading the tracking code 152 with the data reader 30. The electronic address 20 can include a Web page address or an electronic mail address associated with the sender of the package 150, for example.

Figure 7:
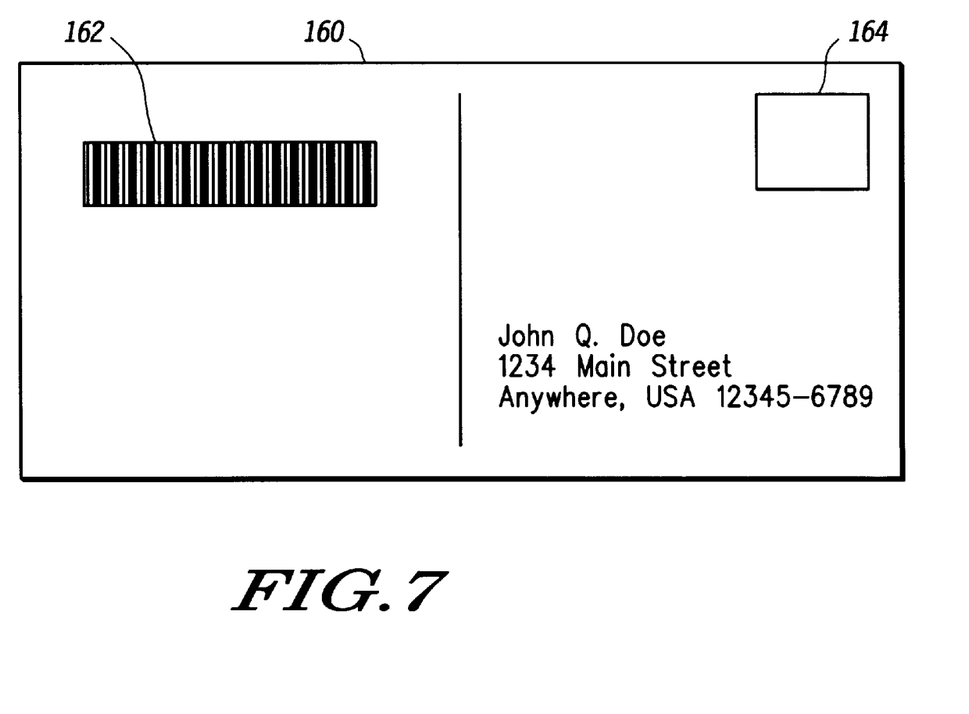
FIG. 7 is an illustration of a third example of the article of mail.

FIG. 7 is an illustration of a third example of the article of mail 12. The article of mail 12 includes a postcard 160. The postcard 160 supports a bar code 162 that encodes the electronic address 20 in accordance with a bar code standard. The postcard 160 also supports a stamp 164 to pay for its delivery.

The end user navigates to the electronic address 20 by reading the bar code 162 with the data reader 30. The bar code 162, for example, can encode a URL for a Web page of the sender or can encode an electronic mail address for the sender.

It is noted that the electronic addresses of FIGS. 5 to 7 can differ from one another. The electronic addresses can include electronic mail addresses and URLs, and the URLs can have different domain names. Further, different domain names can be provided for articles of mail delivered by the same delivery service.

It is noted that as an alternative to the herein-described examples of electronic addresses, the article of mail 12 can be used to navigate to a telephone number (either wireless or wireline), a fax number, a pager number, or a personal communication system (PCS) number. In these cases, the machine-readable data 14 can directly encode any of the aforementioned telecommunication codes. Alternatively, the databases 32 and 34 can store records which associate a telecommunication code with the machine-readable data 14. By reading the machine-readable data 14 using the data reader 30, the end user 24 can automatically initiate a telephone call, a fax, a paging message, or a PCS call to an individual associated with the article of mail 12 (e.g. a sender, a deliverer, a recipient, an advertiser, or another individual).

Optionally, the telecommunication code stored by the database 34 is updated based upon the location and status of the individual. For example, while the individual is at his/her office, the telecommunication code can include a telephone number for the office. While the individual is at home, the telecommunication code can include a home telephone number. While the individual is on the road (e.g. away from both home and the office), the telecommunication code can include a paging number or a wireless telephone number. As a result, the individual can be contacted using the article of mail 12 in a manner transparent to the end user 24.

Thus, there has been described herein several embodiments including preferred embodiments of network navigation methods and systems using an article of mail.

Because the various embodiments of the present invention determine an electronic address based upon machine-readable data associated with the article of mail, they provide a significant improvement in facilitating communication with a party associated with the article of mail.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising the steps of:

receiving an article of mail physically delivered from a sender to a recipient by a delivery service, the article of mail having a bar code which uniquely identifies the article of mail to the delivery service;

reading the bar code after the recipient receives the article of mail, the bar code being read by the recipient using a bar code reader;

determining an electronic address of the sender of the article of mail based upon at least a portion of the bar code read by the recipient using the bar code reader; and communicating a message to the electronic address of the sender, wherein the electronic address includes one of an electronic mail address, a uniform resource locator, and an internet protocol address.

2. The method of claim 1 wherein the bar code includes a two-dimensional bar code.

3. The method of claim 1 wherein the bar code includes at least a portion of an information-based indicia which uniquely identifies the article of mail.

4. The method of claim 1 wherein the message acknowledges receipt of the article of mail.

5. The method of claim 1 wherein the step of determining the electronic address includes retrieving the electronic address from a database based upon at least a portion of the machine-readable data.

6. The method of claim 1 wherein the the bar code includes a tracking code for the article of mail.

7. A system comprising:

a translation device;

a terminal for preparing an article of mail for delivery by a delivery service from a sender to a recipient, the terminal preparing the article of mail to include a bar code which uniquely identifies the article of mail to the delivery service and communicating bar code data encoded by the bar code and an electronic address of the sender to the translation device;

a bar code reader usable by the recipient to read the bar code from the article of mail after the delivery service has physically transported the article of mail to the recipient; and a digital computing device which cooperates with the bar code reader and the translation device to retrieve the electronic address of the sender based upon at least a portion of the bar code read from the article of mail using the bar code reader and to communicate a message to the electronic address of the sender, wherein the electronic address includes one of an electronic mail address, a uniform resource locator, and an internet protocol address.

8. The system of claim 7 wherein the translation device comprises a database associating the electronic address with the bar code data.

9. The system of claim 7 wherein the translation device comprises a node of an electronic network.

10. The system of claim 7 wherein the digital computing device comprises a node of an electronic network.

11. The system of claim 7 wherein the digital computing device comprises a network access apparatus.

12. The system of claim 7 wherein the translation device comprises a network access apparatus.

13. The system of claim 7 wherein the message acknowledges receipt of the article of mail.

14. A method comprising the steps of:

physically delivering an article of mail from a sender to a recipient by a delivery service, the article of mail having a bar code which uniquely identifies the article of mail to the delivery service;

receiving, from either the sender or the delivery service, bar code data encoded by the bar code and an electronic address of the sender, the bar code data and the electronic address being received via an electronic network by a central computer;

storing the bar code data and the electronic address in a database in communication with the central computer;

receiving, from the recipient, the bar code data read from the article of mail using a bar code reader, the bar code data being received by the central computer via he electronic network; and translating the bar code data received from the recipient to the electronic address using the database, wherein the electronic address includes one of an electronic mail address, a uniform resource locator, and an Internet protocol address.

15. The method of claim 14 further comprising the step of communicating a message to the electronic address after the step of translating.

16. The method of claim 15 wherein the message acknowledges receipt of the article of mail.

17. A method comprising the steps of:

physically delivering an article of mail from a sender to a recipient by a delivery service, the article of mail having a bar code which uniquely identifies the article of mail to the delivery service;

receiving, from either the sender or the delivery service, bar code data encoded by the bar code and an electronic address of the sender, the bar code data and the electronic address being received by a central computer via an internet from a computer which assists either the sender or the delivery service in preparing the article of mail to include the bar code;

storing the bar code data and the electronic address in a database in communication with the central computer;

receiving, from the recipient, the bar code data read from the article of mail using a bar code reader, the bar code data being received by the central computer via the internet from a computer associated with the recipient;

translating the bar code data received from the recipient to the electronic address using the database; and communicating to the electronic address of the sender, a message acknowledging receipt of the article of mail after the step of translating, the message being communicated via the internet.

* * * * *